US00RE42744E

(19) United States
(12) Reissued Patent
Malkamaki et al.

(10) Patent Number: US RE42,744 E
(45) Date of Reissued Patent: Sep. 27, 2011

(54) METHOD OF SENDING FEEDBACK INFORMATION IN A FAST AUTOMATIC REPEAT REQUEST FORMING PART OF AN OVERALL WIRELESS COMMUNICATION SYSTEM

(75) Inventors: Esa Malkamaki, Espoo (FI); Deepak Mathew, Billerica, MA (US); Kari Pehkonen, Espoo (FI); Jussi Kahtava, Fleet (GB)

(73) Assignee: Nokia Corporation, Espoo (FI)

(21) Appl. No.: 11/267,890

(22) Filed: Nov. 4, 2005

Related U.S. Patent Documents

Reissue of:
(64) Patent No.: 6,735,180
Issued: May 11, 2004
Appl. No.: 09/608,643
Filed: Jun. 30, 2000

(51) Int. Cl.
*H04B 1/44* (2006.01)

(52) U.S. Cl. ..... 370/282; 370/310; 370/329; 370/341; 370/342; 370/431

(58) Field of Classification Search ..... 370/282, 370/310, 341, 342, 329, 431, 458
See application file for complete search history.

(56) References Cited

U.S. PATENT DOCUMENTS 4,617,657 A 10/1986 Drynan et al.
5,896,394 A * 4/1999 Fukuda ..... 714/712
5,946,320 A 8/1999 Decker
6,069,886 A 5/2000 Ayerst et al.
6,414,945 B1 * 7/2002 Chennakeshu et al. ..... 370/317
6,498,936 B1 * 12/2002 Raith ..... 455/466
6,519,731 B1 * 2/2003 Huang et al. ..... 714/751
6,606,341 B1 * 8/2003 Kanterakis et al. ..... 375/130
6,791,960 B1 * 9/2004 Song ..... 370/335
6,868,075 B1 * 3/2005 Narvinger et al. ..... 370/335

(Continued)

FOREIGN PATENT DOCUMENTS

EP 0 938 207 A 8/1999

(Continued)

OTHER PUBLICATIONS

Yu-Cheun, Jou, Qualcomm, C30-20000627-001, "An update on cdma2000 1XEV Phase 1 (HDR)", power power point presentation made public on Jun. 27, 2000 at Ad Hoc Conference Cal.

(Continued)

*Primary Examiner* — Wayne Cai
(74) *Attorney, Agent, or Firm* — Ware, Fressola, Van Der Sluys & Adolphson LLP

(57) ABSTRACT

A method of sending feedback information in a fast physical layer hybrid automatic repeat request (HARQ) for frequency division duplex communications that form an overall wireless communication system is described in which the received packets are acknowledged by transmitting feedback data to the sender, wherein the acknowledgement comprises the reservation of obtaining a plurality of slots in the uplink/downlink dedicated channel radio frame for the feedback data alone. It is also directed to the transmission of feedback data used in specified slots within each radio frame, wherein the first slot used is based upon the time offset between uplink and downlink channels, as well as based upon the time required for de-interleaving, de-ratematching, decoding and error checking. In an alternative embodiment, the method uses dedicated physical control channel (DPCCH) bits in at least some of the slots for transmitting such feedback data to the sender.

50 Claims, 1 Drawing Sheet

U.S. PATENT DOCUMENTS

| | | | | |
|---|---|---|---|---|
| 6,931,569 | B2 * | 8/2005 | Fong et al. | 714/18 |
| 6,996,069 | B2 * | 2/2006 | Willenegger | 370/252 |

FOREIGN PATENT DOCUMENTS

| | | | |
|---|---|---|---|
| EP | 0 938 207 | A2 | 8/1999 |
| EP | 0 938 207 | A3 | 9/2005 |
| WO | WO 99/23844 | | 5/1999 |
| WO | WO 00/18052 | | 3/2000 |
| WO | WO 01/91356 | A1 | 11/2001 |

OTHER PUBLICATIONS

Mohan Fong et al, Nortel Networks—v30-20000627-03, "1XEV Dual ARQ", power point presentation made public Jun. 27, 2000 at Ad Hoc Conference Call.

Ning Guo et al, Nortel Networks—C30-20000627-005, "1XEV Reverse Link Structure", power point presentation made public Jun. 27, 2000 at Ad Hoc conference Call.

3GPP2 "1XTREME™ presentation by Motorola and Nokia", made public at 3GPP2 ?TSG-C 1Xtreme Ad Hoc Group Mtg. Mar. 28-29/2000, Cheju, Korea.

3GPP2 document, "Supplemental Specification for Support of Very High Rate Traffic in 3G Spread Spectrum Systems", made public at 3GPP2 TSG-C 1Xtreme Ad Hoc Group Mtg. 03/28029/00, Cheju, Korea.

3GPP2 document—Motorola, Nokia and LSI Logic, "Proposal for standardization of very high rate mixed voice-data traffic capabilities, based on extending and enhancing 1X systems", made public at 3GPP2 TSB-C 1Xtreme Ad Hoc group meeting of 03/28029/00, Cheju, Korea.

3GPP—3G-TS 25.212 v.3.3.0, Technical Specification Group Radio Access Network, "Multiplexing and channel coding (FDD)" Release 1999 published on Jun. 26, 2000.

3GPP2—C.S0002-0 Version 1.0 Physical Layer Standard for CDMA2000 Spread Spectrum Systems, pub. Jul. 1999.

R2-001120, Motorola, "High speed downlink patent access", published May 22-26, 2000.

R1-556, Motorola—"Feasibility study of advanced techniques for high speed downlink packet' access", published Apr. 10-13, 2000 at TSG-RAN Mtg., #12, Seoul Korea.

RP-000126, Motorola, "Details of high speed downlink packet access", publiched May 13-15, 2000 at TSGR-RAN Meeting #7, Madrid, Spain.

3GPP2-C30-20000710-004 summary of the 1XEV phase 1, Ad hoc group meeting Jun. 27, 2000.

3GPP2 c00-20000425-021, summary of the 3GPP2 TSG C Xtreme Ad hoc group meeting of Jun. 27, 2000, Cheju, Korea.

3GPP2-C00-200003227 proposed cdma 2000 companion high data rate, publiched on Mar. 27, 2000.

TIA/EIA/IS—856 TR45 CDMA2000 High Rate Packet Data Air Interface Specification, pp. i-xxx (contents) and pp. 9-23 to 9-35, published Sep. 12, 2000.

* cited by examiner

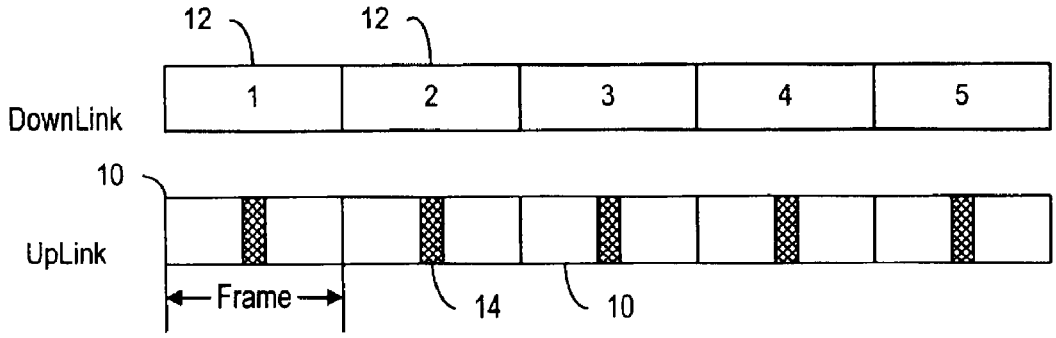
Figure 1 UpLink and DownLink Frames
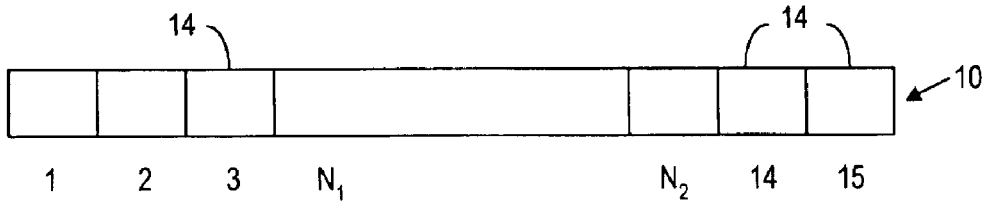
Figure 2 A Radio Frame
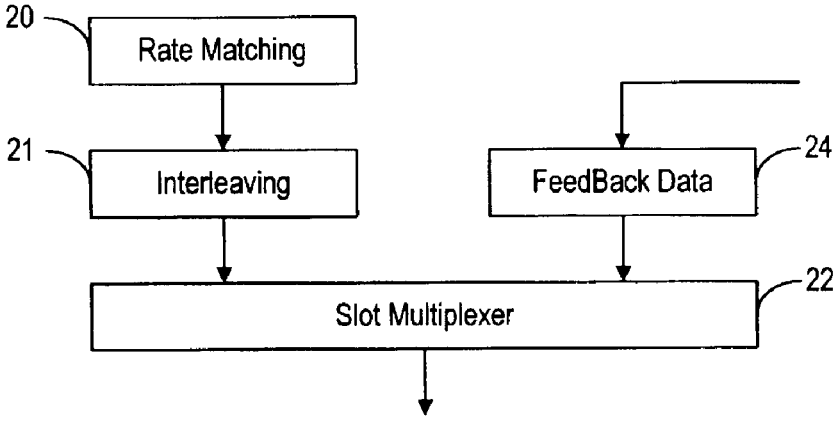
Figure 3
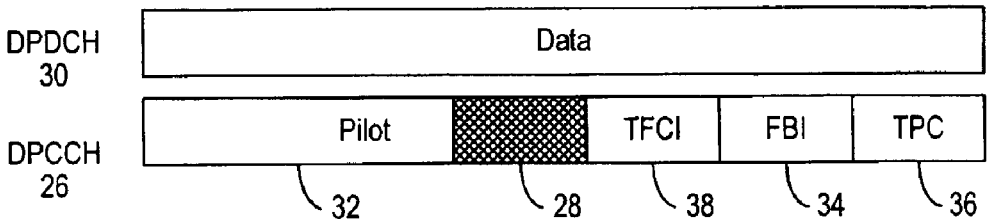
Figure 4 An Uplink radio slot. The shadowed part represents the punctured signaling bits in a slot.

METHOD OF SENDING FEEDBACK INFORMATION IN A FAST AUTOMATIC REPEAT REQUEST FORMING PART OF AN OVERALL WIRELESS COMMUNICATION SYSTEM

Matter enclosed in heavy brackets [ ] appears in the original patent but forms no part of this reissue specification; matter printed in italics indicates the additions made by reissue.

TECHNICAL FIELD

The present invention relates to sending feedback data to a sender of packets in a wireless communication system and in particular is directed to a new feedback channel for use in fast hybrid automatic repeat request.

BACKGROUND OF THE INVENTION

Fast hybrid automatic repeat request (HARQ) has been proposed as a vehicle to solve receiver memory problems which occur when soft combining schemes are used in wireless communications. The fast HARQ requires that an acknowledgement (or the so-called forward order) be transmitted within the next radio frame after the transmission of packet(s) in the forward direction. Hybrid ARQ (HARQ) is a link adaption technique used to improve the performance of wireless communications. In a Type 1 Hybrid ARQ, there is soft combining which is a type of repetition coding in which the retransmitted packet is combined with the initially transmitted packet. In Type 2 Hybrid ARQ, an incremental redundancy scheme is used. In both Type 1 and Type 2 Hybrid ARQ, the soft decision values of the erroneous packet, if detected, must be stored in the receiver which in turn can lead to very high memory requirements at the receiver. Thus the amount of memory required for storing these soft decisions is proportional to the retransmission time interval. Fast hybrid ARQ has been proposed to decrease retransmission delay which in turn decreases the memory requirements at the receiver.

In prior art schemes, the whole ARQ protocol is in the radio link control (RLC) layer and the feedback data as well as the retransmissions have been generated in the RLC layer as described in the Release 1999 3GPP specifications. This type of feedback data is not suitable for fast HARQ if the RLC in the network side is located in the radio network controller (RNC) since the Iub interface between RNC and Node B (the base station) can cause long delays. The delay of the Iub interface is one of the main reasons for the long round trip delays. This prior art technique requires that the retransmission delay becomes very high (typically from approximately ten to twenty transmissions in time intervals (TTIs). This retransmission delay therefore implies that the memory requirements at the transmitter, but especially in the receiver, must be very high in order to be able to retransmit and soft combine the retransmitted packets with the stored packets which were received erroneously.

One way to speed up the whole process is to generate the feedback data in the physical layer of the receiver. Similarly, the retransmissions should be generated at the physical layer of the transmitter. Alternatively, the feedback and the retransmission can also be generated in a layer which is co-located with: the physical layer, thereby eliminating any long delay between these two layers.

There are several ways of transmitting the feedback data. One possibility is to transmit it through existing uplink or downlink channel. This has the problem that the existing channels are usually terminated in the radio network controller (RNC) in the network side, i.e., thee is the delay between the base station and the RNC. Even if the termination of the existing transport channel were changed to a base station in the network side, the transmission delay would be at least three TTIs more than that of the proposed invention since the existing transport channels are interleaved at least over ten milliseconds (ms) (see 3GPP spec).

All the previous implies that a separate fast feedback channel needs to be defined. One straightforward possibility in a CDMA system is to transmit the feedback data using a separate code channel and transmit it in parallel with other data which has been proposed for instance by Motorola Corporation for its one XTREME system. This requires multi-code transmission which is not desirable in the mobile terminal (if the feedback is in the uplink direction).

SUMMARY OF THE INVENTION

The present invention provides a solution for fast feedback associated with-fast HARQ and thereby solves the buffering problem associated with other feedback mechanisms. In particular, the technique of the present invention does not require the use of a separate code channel for feedback information but rather is able to steal some of the capacity from uplink traffic data or control traffic (or downlink traffic depending upon the direction of the packets) in order to provide the necessary feedback data. In another embodiment of the invention, dedicated physical control channel (DPCCH) bits are used for the fast feedback. The method according to the present invention is described with respect to the downlink transmission of a frequency division duplex (FDD) as an example. Thus the feedback is in the uplink direction. Of course, extension of this description to uplink data is straightforward, wherein the feedback would be in the downlink direction.

Hybrid ARQ is a link adaption technique which is used to improve the performance of wireless communication systems and the Type 1 Hybrid ARQ with soft combining uses a type of repetition coding in which the retransmitted packet is combined with the initially transmitted packet. Type 2 Hybrid ARQ uses an incremental redundancy scheme and thus both in Type 1 and Type 2 Hybrid ARQ soft combining is utilized in the receiver and soft decisions values of the erroneous packets have to be stored in the receiver which of course, can lead to very high memory requirements at the receiver. It is thus clear that the amount of memory required for storing the soft decisions is proportional to the retransmission time interval.

For wireless communication system, the uplink and downlink radio frames have a probable time displacement between the uplink and downlink channels. For dedicated channels, the uplink and downlink frames are typically separated by 1,024 chips. The purpose of the fast feedback is to reduce the time interval for transmitting the feedback after receiving the packet. However, the receiver must typically de-interleave, de-ratematch, decode and error check the received packets after reception of the radio frame and all of these operations require time. Thus the fastest way to send acknowledgement is to stuff the feedback data in the next frame in the uplink direction so that the transmitter can retransmit the erroneous packets with a delays of only one transmission timing interval (TTI).

The present invention achieves this goal by reserving a few slots, fully or partly, where the number of slots can be a parameter, in the uplink Dedicated Physical Data Channel (DPDCH) radio frame for feedback data only. This technique implies that data in the uplink direction can be transmitted only in the remaining slots (also in the remaining parts of the slots if the slots are only partly used for feedback). The feedback data is transmitted in slots $N_1$ to $N_2-1$ and the data in the uplink direction are therefore transmitted in slots 1 to $N_1-1$ and in slots $N_2$ to N, where N is the number of slots in a radio frame. In this technique, the value of $N_1$ is dependent upon the time offset between the uplink and downlink channels. It is also dependent upon the time required for any de-interleaving, de-ratematching, decoding and error checking at the receiver. Furthermore, the number of feedback slots ($N_{fb}$) depends on the size of the feedback packet. If forward ordering is used, the value of $N_{fb}$ is typically three or four slots.

An alternative implementation of the fast feedback channel can use some of the dedicated physical control channel (DPCCH) bits in the given slots. Thus feedback bits can be punctured into the pilot, transmit power control (TPC) bits, transport format combination indicator (TFCI) bits and feedback information (FBI) bits of one or several time slots. Alternatively, the feedback information can be time multiplexed with the existing pilot, TPC, TFCI and FBI bits by, for example, changing the spreading factor of the DPCCH so that more channel bits will be available.

BRIEF DESCRIPTION OF THE DRAWINGS

For a fuller understanding of the nature and object of the present invention, reference should be made to the following detailed description, taken in conjunction with the following drawings in which:

FIG. 1 is an illustration of a plurality of downlink and uplink radio frames associated with a wireless communication system, wherein each frame comprises a plurality of slots.

FIG. 2 is an illustration of a radio frame with associated slots numbered one through fifteen and showing the usage of some of those slots for the presentation of feedback data according to the present invention.

FIG. 3 is a flow chart showing how rate matching and interleaving are combined with feedback data by a slot multiplexer.

FIG. 4 is an illustration of an uplink radio slot and how the dedicated physical control channel (DPCCH) bits can be used to provide feedback data.

BEST MODE FOR CARRYING OUT THE INVENTION

As best seen in FIG. 1, wireless communication systems typically communicate from a sender to a receiver via uplink and downlink frames 10 and 12, wherein each frame comprises a plurality of slots 14. For a typical frame, the number slots is fifteen. Typically there is a time displacement between the uplink and downlink channels. For dedicated channels, the uplink and downlink frames are separated typically by 1,024 chips.

As presented herein, the methodology is described with reference to downlink transmission of frequency division duplex (FDD) wireless communications in which the feedback for such communications is presented in the uplink direction. It will be noted to anyone of ordinary skill in the art that extension to uplink data in which the feedback is presented in the downlink direction is a straight-forward extension of this description and forms part of the present invention.

In the development of wireless communications, the concept of automatic repeat requests has been adopted to allow for the receiver of packets to request that any packet be retransmitted if it was not properly received. Of course, this implies that the sender of such a packet must store that information for possible retransmission until such time that the sender receives acknowledgement from the receiver that the packet has been received properly. The longer the time delay between sending the original packet and receiving the acknowledgement, the longer the sender must store that packet for possible retransmission in the event that it is not properly received by the receiver.

Faced with this problem and the associated expense and complexity of large storage, techniques have been adopted which have modified the original automatic repeat request concept in what is now known as hybrid ARQ (sometimes referred to as HARQ). Hybrid ARQ is a link adaptation technique which is used to improve the performance of wireless communication systems. In what is known as Type 1 hybrid ARQ, there is soft combining where a type of repetition coding is performed in which the retransmitted packet is combined with the initially transmitted packet.

In what is known as Type 2 hybrid ARQ, an incremental redundancy scheme is used. For both Type 1 hybrid ARQ with soft combining, as well as Type 2 hybrid ARQ, the soft decision values of the erroneous packet have to be stored in the receiver which can lead to very high memory requirements at the receiver. It is therefore clear that the amount of memory required for storing the soft decisions is proportional to the retransmission time interval. Fast physical layer hybrid ARQ has been proposed to decrease the retransmission delay which in turn decreases the memory requirements at the receiver.

The present invention describes a fast feedback scheme for a fast physical layer hybrid ARQ for data transmitted in the downlink direction. The invention equally applies to where the data is transmitted uplink direction (feedback in the downlink direction). The purpose of fast feedback is to reduce the time interval for transmitting the feedback after receiving the packet. Upon receiving a packet, a receiver typically performs de-interleaving, de-ratematching, decoding and error detection of the packets in the radio frame and these operations require a finite amount of time to perform. Thus the fastest way to send acknowledgement to the sender of the frame is to send the feedback data in the next frame in the uplink direction as shown by slot 14 within each of the uplink frames. With this method, the transmitter can retransmit any erroneous packets with the delay of only one transmission timing interval (TTI).

As best seen in FIG. 2, a practical way to achieve this result is to reserve a few slots (where the number of slots can be a parameter) in the uplink Dedicated Physical Data CHannel (DPDCH) radio frame for use as feedback data alone. The number of feedback slots ($N_{fb}$) typically can range in size from two to four slots and resides specifically in slots $N_1$ to $N_2-1$. Thus $N_{fb}$ is equal to $N_2-N_1$. Other data transmitted in the uplink direction is therefore transmitted in slots 1 to $N_1-1$ and in slots $N_2$ to 15, where 15 slots form a typical radio frame, (that is, where N=15).

The value of $N_1$ depends on the time offset between the uplink channel and the downlink channel, as well as dependent upon the time required to perform de-interleaving, de-ratematching, decoding and error checking (typically cyclical redundancy checking). The value of $N_{fb}$ depends on the size of the feedback packet and if forward ordering is used, the value of $N_{fb}$ is typically three or four slots.

If the uplink and downlink radio frames are time aligned as shown in FIG. 1, then a typical value for $N_1$ is 8 and $N_2$ can be 9, 10, 11 or 12, depending upon the size of the feedback packet (that is $N_{fb}$ can be 1, 2, 3 or 4 slots respectively).

During initial call setup phase, the user equipment (UE) and the network agree upon a suitable size for $N_1$ and $N_2$. The network and ratematching unit 20 (see FIG. 3) ensure that the uplink data can be accommodated in $15-N_{fb}$ slots. The slot multiplexer 22 multiplex the uplink data as well as the feedback packets 24 into the proper slots.

The space or gap for the feedback channel can be generated in the same way as that used for compressed mode, that is by puncturing or by higher layer scheduling. The latter technique is usually more appropriate since the needs for the feedback channel are known beforehand and can be taken into account when defining transport format combinations.

The feedback slot(s) $N_{fb}$ need not necessarily be transmitted during the next radio frame. The feedback can be delayed due to processing delays so as to be presented in a later frame with an associated known offset between the data channel and the feedback channel. However, the feedback channel would itself be implemented in the same manner as described above.

The feedback slots may use the same or a different spreading factor (SF) as the other data. The reason for a different SF can be, for instance, the desire to use a fixed SF for the feedback channel regardless of the SF used for other data. A fixed SF for the fast feedback channel can simplify the reception of the fast feedback channel if a separate receiver is used for the fast feedback channel. A fixed SF for the fast feedback channel can be implemented by repeating the fast feedback bits n times if the SF of the feedback channel is n times larger than the SF of the data channel. If, on the other hand, the same receiver is used for both data and feedback, then the same SF is desirable for both feedback and other data.

Alternative Embodiment

As best seen in FIG. 4, an alternative implementation of the fast feedback channel can make use of bits in the dedicated physical control channel (DPCCH) 26 in the given slots of the radio frame. An uplink radio frame is shown in FIG. 4. Region 28 is the portion of the DPCCH channel where signalling bits are punctured for use as feedback. Feedback bits can be punctured into the pilot, feedback (FBI) or transmit power control (TPC) fields of one or several time slots. FIG. 4 shows feedback bits punctured into the pilot field of uplink DPCCH. Downlink DPCCH can be punctured in a similar fashion. If more than only a few feedback bits are needed, the spreading factor (SF) of the DPCCH can be reduced, thus creating more bits per time slot. The signalling information can then be mapped to some of the uplink slots and there would still be room for pilot, transport format combination indicator (TFCI), FBI and TPC bits. Feedback information can also be encoded within the TFCI field if the number of transport format combinations needed during the connection leaves part or whole of the TFCI field unused. The dedicated physical data channel DPDCH 30 is also shown in FIG. 4.

In addition, the present invention can be use for a time division duplex as well as frequency division duplex communication format. For time division duplex, the data is normally transmitted in given slots thereby forming bursts. The use of fast feedback requires that the proper slot (with a given offset to the other data channel) be allocated for that user. The feedback channel can use a part of the capacity of the burst or the entire burst. Once the required slot is allocated, ratematching can be used to introduce the gap needed for the fast feedback channel and the feedback bits can be added after second interleaving. That is, they can be added before the second interleaving if time slot related second interleaving is used.

In general, the methodology of the present invention can be used for any feedback signalling, especially if the timing requires the use of a certain position within the frame for such signalling. For instance, fast cell site selection can use similar feedback signalling methodology.

Thus what has been described is a method of sending feedback information in a fast automatic repeat request in which received packets are acknowledged by transmitting feedback data to the sender of the packets, wherein the acknowledgement comprises the reservation of a plurality of slots in the uplink dedicated channel radio frame for the feedback data alone. It is also directed to a method of providing fast feedback in which dedicated physical control panel (DPCCH) bits are used in at least some of the slots for transmitting the feedback data to the sender.

What is claimed is:

1. A method of sending feedback information in a fast *hybrid* automatic repeat request for frequency division duplex or time division duplex communication that form an overall wireless communication system having uplink traffic and downlink traffic transmitted in a plurality of slots forming a frame, comprising [the steps of]:

receiving packets at a receiver, where the received packets are then de-interleaved, de-ratematched, decoded and monitored for error detection; and acknowledging the received packets by transmitting feedback data to [the] *a* sender of the packets, said acknowledgement comprising the reservation of a plurality of slots in the uplink or downlink dedicated physical channel radio frame for the feedback data*, so that the feedback data is sent in the fast hybrid automatic repeat request at a physical layer instead of a link layer*.

2. A method according to claim 1, where there are N slots per frame and wherein the feedback data is transmitted in slots $N_1$ to $N_2-1$ and the data in the uplink or downlink direction are transmitted in slots 1 to $N_2-1$ and in slots $N_2$ to N, where $N_1>1$ and [$N2>N_1+1$] $N_2>N_1+1$.

3. A method according to claim 2, wherein the value of $N_1$ is based upon the time offset between uplink and downlink channels as well as based upon the time required for de-interleaving, de-ratematching, decoding and cyclical redundancy checking.

4. A method according to claim 3, wherein the number of slots reserved for feedback data, ($N_{fb}=N_2-N_1$) is a function of the size of the feedback packet.

5. A method according to claim 1, wherein the value of $N_1$ is based upon the time offset between uplink and downlink channels as well as based upon the time required for de-interleaving, de-ratematching, decoding and cyclical redundancy checking.

6. A method according to claim 5, wherein the number of slots reserved for feedback data, ($N_{fb}=N_2-N_1$) is a function of the size of the feedback packet.

7. A method according to claim 1, wherein the plurality of slots in the uplink or downlink dedicated physical channel radio frame for the feedback data is used for the feedback/data only.

8. A method of sending feedback information in a fast automatic repeat request for frequency division duplex or time division duplex communication that form an overall wireless communication system having uplink traffic and downlink traffic, transmitted in a plurality of slots forming a frame, comprising [the steps of]:

receiving packets at a receiver, where the received packets are then de-interleaved, de-ratematched, decoded and monitored for error detection; and using less than all of the dedicated physical control channel [(DPCCH)] bits in at least some of the slots for transmitting the feedback data to the sender, *so that the feedback data is sent in the fast hybrid automatic repeat request at the physical layer instead of a link layer.*

9. A method according to claim 8, wherein if more than a few feedback bits are required, than the spreading factor [(SF)] of the [DPCCH] *dedicated physical control channel* is reduced, thereby creating more bits per time slot for use at least in part as feedback bits.

10. A method according to claim 8, wherein the feedback data to be transmitted to the sender is punctured into bits of the pilot, feedback [(FBI)] *information* or transmit power control [(TPC)] fields in at least one time slot.

11. A method according to claim 8, wherein the feedback data to be transmitted to the sender is punctured into bits of the transport format combination indicator [(TFCI)] field if the number of transport format combinations needed during the connection leaves part or whole of the [TFCI] *transport format combination indicator* field unused.

12. A method of sending feedback information in a fast *hybrid* automatic repeat request for frequency division duplex or time division duplex communication that form an overall wireless communication system having uplink traffic and downlink traffic transmitted in a plurality of slots forming a frame, comprising [the steps of]:

receiving packets at a receiver, where the received packets are then de-interleaved, de-ratematched, decoded and monitored for error detection; and acknowledging the received packets by transmitting feedback data in a feedback channel to [the] *a* sender of the packets, wherein *a space or gap for* the feedback channel is generated in the same manner as a channel is generated for compressed mode, *so that the feedback data is sent in the fast hybrid automatic repeat request at a physical layer instead of a link layer.*

13. A method according to claim 12, wherein the feedback channel is generated by puncturing into fields.

14. A method according to claim 13, wherein the fields are control fields.

15. A method according to claim 14, wherein the fields are control fields and/or data fields.

16. A method according to claim 13, wherein the feedback data can be delayed and therefore presented in a later frame.

17. A method according to claim 12, wherein the feedback channel can be generated by higher layer scheduling.

*18. A method of sending feedback data in a fast hybrid automatic repeat request within a wireless communication system, comprising:*

*receiving packets at a receiver, where the received packets are then de-interleaved, de-ratematched, decoded and monitored for error detection: and*

*acknowledging the received packets by transmitting an acknowledgement to a sender of the packets,*

*wherein the acknowledgement comprises full or partial reservation of an at least one slot in an uplink or a downlink dedicated physical channel radio frame for a feedback data, and*

*wherein the feedback data of the acknowledgement is contained in the at least one slot reserved fully or partially for said acknowledgement, so that the feedback data is sent in the fast hybrid automatic repeat request at the a physical layer instead of a link layer.*

*19. A method according to claim 18, where there are N slots per radio frame and wherein the feedback data is transmitted in slots $N_1$ to $N_2-1$ and the data in the uplink or downlink direction are transmitted in slots $N_2$ to N, and $N_2>N_1+1$.*

*20. A method according to claim 19, wherein the value of $N_1$ is based upon the time offset between uplink and downlink channels as well as based upon the time required for de-interleaving, de-ratematching, decoding and cyclical redundancy checking.*

*21. A method according to claim 20, wherein the number of slots reserved for feedback data, $N_{fb}=N_2-N_1$, is a function of the size of the feedback data.*

*22. The method of claim 19, wherein N is less than or equal to fifteen.*

*23. The method of claim 19, wherein the feedback data is transmitted in one of the slots forming the dedicated physical channel.*

*24. The method of claim 19, wherein $N_1>1$, and wherein the data in the uplink or downlink direction are also transmitted in slots 1 to $N_1-1$.*

*25. A method according to claim 18, wherein the value of $N_1$ is based upon the time offset between uplink and downlink channels as well as based upon the time required for de-interleaving, de-ratematching, decoding and cyclical redundancy checking.*

*26. A method according to claim 25, wherein the number of slots reserved for feedback data $N_{fb}=N_2-N_1$, is a function of the size of the feedback data.*

*27. A method according to claim 18, wherein the at least one slot in the uplink or downlink dedicated physical channel radio frame for the feedback data is used for the feedback data only.*

*28. A method according to claim 18, wherein the uplink or downlink dedicated physical channel is an uplink or a downlink dedicated physical control channel.*

*29. A method according to claim 28, wherein said partial reservation of the at least one slot comprises using less than all of the dedicated physical control channel bits in the at least one slot for transmitting the feedback data to the sender.*

*30. A method according to claim 29, wherein if more than a few feedback bits are required, then the spreading factor of the dedicated physical control channel is reduced, thereby creating more bits per time slot for use at least in part as feedback bits.*

*31. A method according to claim 29, wherein the feedback data to be transmitted to the sender is punctured into bits of the pilot, feedback or transmit power control fields in the at least one time slot.*

*32. A method according to claim 29, wherein the feedback data to be transmitted to the sender is punctured into bits of the transport format combination indicator field if the number of transport format combinations needed during the connection leaves part or whole of the transport format combination indicator field unused.*

*33. The method according to claim 18, wherein the feedback channel is generated for compressed mode, by puncturing or higher layer scheduling.*

*34. A method according to claim 33, wherein the feedback channel is generated by puncturing into fields.*

*35. A method according to claim 34, wherein the fields are control fields.*

*36. A method according to claim 35, wherein the fields are control fields and/or data fields.*

*37. A method according to claim 34, wherein the feedback data can be delayed and therefore presented in a later frame.*

*38. A method according to claim 33, wherein the feedback channel can be generated by higher layer scheduling.*

*39. The method of claim 18, wherein the reservation of the at least one slot entails taking capacity from data traffic or control traffic in order to provide the feedback data.*

*40. The method of claim 18, wherein other data is transmitted in remaining slots or parts of slots.*

*41. The method of claim 18, wherein the error detection comprises cyclical redundancy checking.*

*42. The method of claim 18, wherein rate matching is combined with feedback data.*

*43. The method according to claim 18, wherein the uplink or downlink dedicated physical channel is an uplink or a downlink dedicated physical data channel.*

*44. The method of claim 18, wherein the acknowledgment having the feedback data is required by the hybrid automatic repeat request.*

*45. The method of claim 18, wherein the feedback in the dedicated physical channel is uplinked in response to a downlink transmission.*

*46. The method of claim 18, wherein the method is for frequency division duplex or time division duplex communication.*

*47. A system for sending feedback data in a fast hybrid automatic repeat request within a wireless communication network, the system comprising:*

*a receiver for receiving packets, wherein the received packets are then de-interleaved, de-ratematched, decoded and monitored for error detection:*

*a transmitter for acknowledging the received packets by transmitting an acknowledgement to a sender of the packets,*

*wherein the acknowledgement comprises full or partial reservation of the at least one slot in an uplink or a downlink dedicated physical channel radio frame for a feedback data, and*

*wherein the feedback data of the acknowledgement is contained in a at least one slot reserved fully or partially for said acknowledgement, so that the feedback data is sent in the fast hybrid automatic repeat request at the a physical layer instead of a link layer.*

*48. A mobile terminal for utilizing feedback data in a fast hybrid automatic repeat request within a wireless communication network, the mobile terminal comprising:*

*a receiver for receiving packets, wherein the received packets are then de-interleaved, de-ratematched, decoded and monitored for error detection;*

*a transmitter for acknowledging the received packets by transmitting an acknowledgement to a sender of the packets,*

*wherein the acknowledgement comprises full or partial reservation of a at least one slot in an uplink or a downlink dedicated physical channel radio frame for the feedback data, and*

*wherein the feedback data of the acknowledgement is contained in the at least one slot reserved fully or partially for said acknowledgement, so that the feedback data is sent in the fast hybrid automatic repeat request at the a physical layer instead of a link layer.*

*49. A network element for utilizing feedback information in a fast hybrid automatic repeat request within a wireless communication, the network element comprising:*

*a receiver for receiving packets, wherein the received packets are then de-interleaved, de-ratematched, decoded and monitored for error detection;*

*a transmitter for acknowledging the received packets by transmitting an acknowledgement to a sender of the packets,*

*wherein the acknowledgement comprises full or partial reservation of the at least one slot in an uplink or a downlink dedicated physical channel radio frame for a feedback data, and*

*wherein the feedback data of the acknowledgement is contained in the at least one slot reserved fully or partially for said acknowledgement, so that the feedback data is sent in the fast hybrid automatic repeat request at a physical layer instead of a link layer.*

*50. The network element of claim 49, wherein the network element is a base station or a radio network controller.*

* * * * *